United States Patent [19]

Dixon et al.

[11] Patent Number: 5,087,283

[45] Date of Patent: Feb. 11, 1992

[54] SYMPATHETIC INK FOR INK JET PRINTER

[76] Inventors: Marvin P. Dixon, 2601 Hope Ct.; Haywood A. Walker, Jr., Box 432-D, Rt. 1, both of Liberty, Mo. 64068

[21] Appl. No.: 459,955

[22] Filed: Jan. 2, 1990

[51] Int. Cl.$^5$ .............................................. C09D 11/02
[52] U.S. Cl. ........................ 106/21; 503/211; 503/213; 503/217; 503/219; 427/145; 427/150
[58] Field of Search .............. 106/21; 503/211, 213, 503/217, 219; 427/145, 150

[56] References Cited

U.S. PATENT DOCUMENTS

| | | | |
|---|---|---|---|
| 3,349,408 | 10/1967 | Gillen et al. | 503/211 |
| 3,363,338 | 1/1968 | Skinner et al. | 503/204 |
| 3,451,143 | 6/1969 | Thomas et al. | 434/328 |
| 3,505,366 | 4/1970 | Greco et al. | 260/399 |
| 3,632,364 | 1/1972 | Thomas et al. | 106/21 |
| 3,640,750 | 2/1972 | Schutzner | 427/145 |
| 3,788,863 | 1/1974 | Schever | 106/21 |
| 3,823,022 | 7/1974 | Thomas | 503/217 |
| 4,051,283 | 9/1977 | Thomas et al. | 106/21 |
| 4,097,637 | 6/1978 | Loria et al. | 427/152 |
| 4,303,719 | 12/1981 | Vassiliades | 427/150 |
| 4,455,262 | 6/1984 | Detienne et al. | 562/26 |
| 4,461,496 | 7/1984 | Ludwig | 106/21 |
| 4,631,203 | 12/1986 | Schaefer et al. | 106/21 |
| 4,784,876 | 11/1988 | Walker, Jr. et al. | 106/21 |

FOREIGN PATENT DOCUMENTS 415535  5/1933  United Kingdom .

Primary Examiner—Mark L. Bell
Assistant Examiner—Helene K. Klemanski
Attorney, Agent, or Firm—Hovey, Williams, Timmons & Collins

[57] ABSTRACT

Sympathetic ink compositions particularly adapted for use with high speed, non-impact ink printing equipment are disclosed, together with methods of use and development thereof. The inks of the invention are water-based and include of from about 4–20% by weight of a water soluble transition metal salt (e.g., nickel sulfate), together with of from about 2–4.5%, by weight of n-butanol or 2-butanol. After application using, e.g., ink jet printing equipment, the resulting inked images are invisible to the naked eye, and can be selectively developed through use of color-forming developers such as dimethylglyoxime- or oxalic acid-type aqueous compositions.

12 Claims, No Drawings

SYMPATHETIC INK FOR INK JET PRINTER

BACKGROUND OF THE INVENTION

1. Field of the Invention

The present invention is broadly concerned with an improved aqueous sympathetic ink composition particularly adapted for use with any non-impact printers using liquid inks, e.g., ink jet printers. More particularly, the invention pertains to such a composition, and a corresponding method of use, wherein the ink composition preferably includes therein a water soluble transition metal salt and an amount of n-butanol. The ink of the present invention is designed to dry as an essentially invisible image on a substrate, which can later be developed by application of a color precursor developer.

2. Description of the Prior Art

Modern day sympathetic ink systems of commercial importance are designed for a variety of uses, for example in self-testing educational booklets. In such uses, a student may be provided with a multiple choice answer sheet, with the correct answer being indicated by appropriate latent image indicia. In selecting an answer, the student marks one of the multiple choice possibilities with the developer substance; if his selection is correct, the latent indicia will reveal the student's correct choice and hence his progress. Other uses include certification testing, personnel selection and screening tests, novelty items such as games and toys, games of chance such as lotteries, children's books designed for educational and/or entertainment purposes, securing of documents, prize verification and promotional items.

Such sympathetic ink systems typically involve application of a latent image by means of a normally invisible printing ink. Thereafter, a developer substance is applied over the invisible image and a color-forming chemical reaction occurs to "develop" the image and render the same visible.

U.S. Pat. Nos. 4,631,203 and 4,784,876 describe particularly useful sympathetic ink/developer systems which give sharp, long-lasting, non-smearing images. However, these systems are designed for use with conventional lithographic, letter press, letterset, flexographic, silk screen or rotogravure printing equipment and hence the ink systems thereof are typically rather thick and viscous.

In many applications, however, it would be advantageous to employ non-impact printers such as ink jet printing equipment in the production of latent imaged items. Typical sympathetic ink systems of the type described in the aforementioned patents are not suitable for use in ink jet printers, because they have inappropriate viscosity and surface tension properties. As a consequence, it has heretofore been impossible to employ ink jet printers to give latent imaged products, even though the flexibility and printing characteristics inherent in such equipment would otherwise make it ideally suited for this application.

SUMMARY OF THE INVENTION

Broadly speaking, the ink compositions of the present invention are adapted for use in ink jet printers and comprise an aqeous dispersion including therein from about 4 to 20% by weight of a water soluble transition metal salt, together with of from about 2 to 4.5% by weight of n-butanol or 2-butanol. A particularly preferred salt is nickel sulfate.

In application procedures, an ink of the character described is employed in conjunction with otherwise conventional non-impact printing equipment, and the ink composition has viscosity and surface tension values appropriate for ink jet printing. If ink jet equipment is employed, the process includes forming droplets of the ink (typically having an average particle size on the order of from 6 to 10 mils.), electrostatically charging such droplets, and directing at least certain of the non-deflected charged droplets onto a substrate to form an image thereon which is invisible to the naked eye. Charged droplets not intended for substrate application are electrically deflected away from the substrate.

DESCRIPTION OF THE PREFERRED EMBODIMENTS

Preferred sympathetic ink compositions in accordance with the present invention include from about 4 to 20% by weight of a water soluble salt selected from the group consisting of the sulfates, nitrates, halides and acetates of cobalt, nickel and copper, and mixtures thereof, and more preferably of from 6 to 12% by weight of the salt. Additionally, the inks include of from about 2.0 to 4.5% by weight of n-butanol or 2-butanol, and more preferably of from about 2.2 to 4.4% by weight thereof. The balance of the inks hereof is normally water, although other substances may be added if desired.

The most preferred ink composition is formulated by first mixing 7,296 ml of water with 1,028 g. of nickel sulfate pentahydrate, followed by adding 304 ml of n-butanol. This corresponds to about 12% by weight of nickel sulfate, and about 2.9% by weight of n-butanol in the composition.

As indicated previously, the ink compositions of the invention should possess viscosity and surface tension properties enabling use of the compositions with ink jet printing equipment. To this end, the compositions of the invention should have viscosities in the range of from about 0.9 to 1.2 cps., and surface tensions of from about 30 to 50 dynes/cm.

After application of the inks of the invention using ink jet printing equipment, the resultant printed substrate includes images thereon which are and remain normally invisible to the naked eye for an indefinite period, and at a minimum period at least about three months. When it is desired to develop the latent images, it is necessary to apply a color-forming developer over the previously imprinted images. A variety of such developers may be used with the inks of the invention, and in particular the developers described in U.S. Pat. Nos. 4,631,203 and 4,784,876, both of which are incorporated by reference herein. The most preferred developer is the type described in the '876 patent, and includes of from about 50-90% by weight water, of from about 1-5% by weight dimethylglyoxime, and a minor amount of a base. Such a developer, when used in conjunction with a nickel-based sympathetic ink, gives a stable, long-lasting, sharp color image which is red in color. The '203 patent describes other developer systems useful in the context of the present invention, such developers including oxalic acid or a derivative thereof. Typically, the selected developer can be packaged as a liquid pen, as to facilitate application of the developer substance over latent images.

The inks of the invention may be used to imprint a variety of substrates, and indeed the only substrate limitation derives from the ink jet printing equipment itself, i.e., any substrate capable of being imprinted using this equipment may be imaged with the sympathetic inks of the invention.

We claim:

1. An ink composition adapted for use in non-impact printers and comprising an aqueous dispersion including therein from about 4 to 20% by weight of a water soluble salt selected from the group consisting of sulfates, nitrates, halides and acetates of cobalt, nickel and copper, and mixtures thereof, and from about 2.0 to 4.5% by weight of an alcohol selected from the group consisting of n-butanol and 2-butanol, said composition being characterized by the properties of having viscosity and surface tension values respectively being from about 0.9 to 1.2 cps. and from about 30 to 50 dynes/cm for permitting the composition to be applied by an non-impact printer and being invisible to the naked eye when so applied to a substrate.

2. The ink composition of claim 1, said salt being nickel sulfate.

3. The ink composition of claim 1, said salt being present at a level of from about 6 to 12% by weight.

4. The ink composition of claim 1, said n-butanol being present at a level of from about 2.9% by weight.

5. The ink composition of claim 1, the balance of said composition being water.

6. A method of imaging a substrate with a concealed image by means of a non-impact printer, said method comprising the steps of:

providing an aqueous ink including therein from about 4 to 20% by weight of a water soluble salt selected from the group consisting of the sulfates, nitrates, halides and acetates of cobalt, nickel and copper, and mixtures thereof, and from about 2.0 to 4.5% by weight of an alcohol selected from the group consisting of n-butanol and 2-butanol, said ink having a viscosity of from about 0.9 to 1.2 cps. and a surface tension of from about 30 to 50 dynes/cm; and applying said ink to a substrate using a non-impact printer, comprising the steps of forming droplets of the ink having an average particle size of from about 6 to 10 mils, electrostatically charging such droplets, and directing at least a portion of the droplets onto said substrate to form an image thereon which is invisible to the naked eye.

7. The method of claim 6, including the step of developing said image to render the same visible, said developing comprising applying to said image a liquid developer substance including a color precursor compound.

8. The method of claim 7, said developer comprising of from about 50-90% by weight water, from about 1-5% by weight dimethylglyoxime, and a base.

9. The method of claim 7, said developer including oxalic acid or a dithiooxalic acid.

10. The method of claim 6, said salt being nickel sulfate.

11. The method of claim 6, said salt being present at a level of from about 6-12% by weight.

12. The method of claim 6, wherein said alcohol is n-butanol.

* * * * *